Patented Aug. 11, 1936

2,050,239

UNITED STATES PATENT OFFICE 2,050,239

TEMPORARY PROTECTIVE COATING

Raymond W. Albright and Andrew Szegvari, Akron, Ohio, assignors to American Anode Incorporated, Akron, Ohio, a corporation of Delaware No Drawing. Application August 17, 1932, Serial No. 629,126

3 Claims. (Cl. 91—68)

This invention relates to a method of providing articles with temporary film-like coatings of rubber for the protection of the articles during shipping and storage.

Numerous articles of commerce are manufactured and finished with a highly polished or otherwise sensitive surface which must be maintained and protected until such article is sold and placed in service. The accomplishment of this end normally presents difficulties because of the likelihood of the articles being bumped or scuffed or otherwise mechanically injured while being handled, and also because of the deleterious effect on the article of air, moisture, dust, grease, and other similar agents with which it may come in contact.

The object of this invention is to provide a rapid, inexpensive, efficient method of providing articles with a non-adherent, resilient protective film which will exclude air, moisture, etc., prevent contamination of the article, and protect its surface from mechanical injury, which film may be readily and easily removed from the article when desired.

In employing the present invention, the article to be protected is first covered with a coating of material non-adherent to rubber, and then a film of rubber, preferably from a liquid dispersion of rubber, is superposed thereover, the non-adherent material forming a separating stratum between the rubber and the article which prevents adherence of the rubber film to the surface of the article and hence facilitates the later removal of the film therefrom.

Any non-adherent material which will not injure the surface of the article or the rubber film may be used to form the separating stratum of this invention, but certain ones have proved to be especially useful for that purpose, namely finely-divided materials whose particles are essentially plate- or needle-like in form, such as mica, graphite, diatomaceous earths such as fossil flour or kieselguhr, soapstone, and magnesium carbonate, as well as lime, and the like; a second class of more or less waxy materials including both waxes and resins of the well-known types, and a third class comprising oily liquids.

If one of the first class of materials is used in forming the separating stratum, it is preferably applied to the article as a liquid mixture containing the finely-divided material suspended in a liquid vehicle, whch may be a volatile organic solvent such as an alcohol or a ketone, if the nature of the surface of the article is such that it will not be damaged thereby, or which may be water, or other liquid. After the application of the mixture, a sufficient amount of the liquid vehicle is removed, as by evaporation, to render the coating viscous and substantially non-flowing. In some cases, it may be desirable to have the temperature of the mixture somewhat above room temperature when it is applied to the article, so that the evaporation of the liquid from the coating will be accelerated. Alternatively, the finely-divided material may be dusted on, or otherwise applied to the article.

If it is desired to use a wax or resin as the separating material, this may be applied to the surface of the article in any of the numerous conventional manners now practiced, such as buffing, hand-rubbing, applying in the molten state, or otherwise, and the rubber applied thereover as hereinabove described.

The oily liquids such as gasoline, kerosene, or the commercial product known as "Glucopone AA", are especially useful as separating materials when the article to be provided with the temporary coating has been painted, varnished, or otherwise treated in such manner that the surface is likely to be spotted by the liquid vehicle of the rubber dispersion, particularly when aqueous rubber dispersions are used. The oils may be sprayed, brushed, or applied in other manners to the surface to be protected. The resultant oily film effectively prevents spotting of the sensitive surface upon application of the dispersion, and serves as a separating stratum to prevent adherence of the dried rubber film to the surface of the article. If a rubber-soluble oil is used, it will be absorbed slowly by the rubber film and thereby eliminate the necessity of removing it after stripping the rubber from the article.

After the separating stratum is associated with the article, a film of rubber, preferably from a liquid dispersion of rubber is applied thereover in any one of the manners now employed in utilizing rubber dispersions, such as dipping the article into the dispersion, or spraying or brushing the dispersion on to the article, after which the dispersion is dried to form a protective film of rubber, which may be vulcanized if desired, by applying heat or subjecting the rubber to the action of acid vapors, although vulcanization of the rubber film usually will be unnecessary.

If it is desired to accelerate the setting of the rubber film, or in using the dipping method, to secure a thicker film of rubber at one immersion of the article in the dispersion, a suitable rubber coagulant may be applied over the separating stratum, as by dipping the article into the coagulant or by spraying the coagulant or a solution thereof on to the coated article either before or after the application of the rubber film, or in an alternative method, the coagulant may be mixed with the material forming the separating stratum and the two applied simultaneously.

Any of the well known and commonly used rubber coagulants such as formic, acetic, oxalic, and other acids; or the salts of polyvalent metals such as the nitrates, chlorides, sulfates, etc. of calcium, magnesium, or zinc or dehydrants such as alcohol, acetone, and similar materials may be used in this process, provided they will not injure the article being coated.

In the specific example of the manner of carrying out the invention, the article to be protected, which may be a highly-polished chromium-plated automobile fitting, is momentarily immersed in a bath containing two hundred grams of kieselguhr and two hundred grams of calcium nitrate crystals in one liter of water, and thereafter a sufficient quantity of the water evaporated, either naturally, or by heating the article, to render the coating non-flowing, after which the article with its associated coating of kieselguhr and coagulant is immersed in an aqueous dispersion of rubber for a time sufficient to allow a rubber film of the desired thickness to be deposited upon the article by the action of coagulating ions diffusing from the coagulant-containing coating. Thereafter, the rubber is dried in any convenient manner to form a continuous protective film covering the surface of the article.

In a second example, the article to be protected may be a piece of furniture, in which case it will usually be desirable to use a wax or an oil as the separating material, which is applied to the surface of the furniture in any of the manners hereinabove indicated, after which, a film of an aqueous dispersion of rubber is applied thereover, preferably by spraying, and the film allowed to dry by natural evaporation of water from the dispersion.

In either of the above examples, or in any other case where the present invention is carried out in a like manner, the article will be efficiently protected against the deleterious action of air, moisture, dust, grease, and similar agents, as well as against mechanical injury to the surface thereof, by a continuous, encasing film of rubber, which film by virtue of the non-adherent stratum separating it from the surface of the article, may be removed or stripped therefrom without difficulty, when it is desired to place the article in service.

The term "rubber" has been used herein in a generic sense to include caoutchouc, balata, gutta percha, and like gums, whether in the unvulcanized, vulcanized or reclaimed condition, as well as synthetic rubbers, rubber substitutes, etc. Likewise the term "dispersion of rubber" includes flowable liquids made by dispersing rubber as hereinabove defined in liquid vehicles, either solvents or non-solvents of rubber, and either with or without the aid of dispersing and/or stabilizing agents, as well as latices of rubber, either in a natural condition or modified by dilution, concentrations and/or by the addition of thickening, thinning or other modifying materials.

The liquid dispersions of rubber may contain compounding and vulcanizing agents, accelerators, age-resisters and other ingredients commonly employed in rubber compositions.

While the process of the present invention has been described in connection with certain classes of articles, it obviously is not limited to such use, but is equally applicable in providing temporary protective coverings for many other articles, and it is further apparent that numerous modifications may be made in the process as hereinabove described without departing from the spirit of the discovery or the principles of the invention as set forth in the appended claims.

We claim:

1. In a method for providing a readily removable temporary protective covering about an article having an easily damaged surface by applying thereto an aqueous dispersion of rubber and drying, the process which includes providing upon the surface of the article a thin coating of a volatile oily liquid, and subsequently applying the protective covering.

2. In a method for providing a readily removable temporary protective covering about an article having an easily damaged surface by applying thereto a film of liquid rubber latex and drying, the process which includes providing upon the surface of the article a thin coating of a volatile oily liquid, and subsequently applying the protective covering.

3. In a method for providing a readily removable temporary protective covering about an article having an easily damaged surface by applying thereto a film of liquid rubber latex and drying, the process which includes providing upon the surface of the article a thin coating of a volatile liquid hydrocarbon, and subsequently applying the protective covering.

RAYMOND W. ALBRIGHT.
ANDREW SZEGVARI.